US012719538B2

(12) United States Patent
Lee et al.

(10) Patent No.: US 12,719,538 B2
(45) Date of Patent: Aug. 25, 2026

(54) CHANNEL ACQUISITION AND CHANNEL STATE FEEDBACK FOR ANALOG AND DIGITAL PRECODING USING JOINT OPTIMIZATION

(71) Applicant: QUALCOMM Incorporated, San Diego, CA (US)

(72) Inventors: Hyojin Lee, San Diego, CA (US); Yu Zhang, San Diego, CA (US); Jing Jiang, San Diego, CA (US); Jing Sun, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 52 days.

(21) Appl. No.: 18/800,601

(22) Filed: Aug. 12, 2024

(65) Prior Publication Data

US 2026/0045985 A1 Feb. 12, 2026

(51) Int. Cl.
*H04B 7/06* (2006.01)
*H04B 7/0456* (2017.01)

(52) U.S. Cl.
CPC ........... *H04B 7/061* (2013.01); *H04B 7/0456* (2013.01)

(58) Field of Classification Search
CPC .... H04B 7/061; H04B 7/0456; H04B 7/0632; H04B 7/0626; H04B 7/0639; H04B 7/0634; H04B 7/06956; H04B 7/0695
See application file for complete search history.

(56) References Cited

U.S. PATENT DOCUMENTS

| | | | | |
|---|---|---|---|---|
| 10,491,286 B2 * | 11/2019 | Park | ..................... | H04B 7/0617 |
| 10,516,462 B2 * | 12/2019 | Wu | ...................... | H04B 7/0482 |
| 10,715,237 B1 * | 7/2020 | Landis | .................. | H04L 5/0057 |
| 10,903,887 B2 | 1/2021 | Park et al. | | |

(Continued)

FOREIGN PATENT DOCUMENTS

| | | | |
|---|---|---|---|
| WO | WO-2017195183 A1 | 11/2017 | |
| WO | WO-2023049198 A1 * | 3/2023 | ............. G06N 20/00 |

(Continued)

OTHER PUBLICATIONS

International Search Report and Written Opinion—PCT/US2025/038352—ISA/EPO—Nov. 5, 2025.

*Primary Examiner* — Sophia Vlahos
(74) *Attorney, Agent, or Firm* — Holland & Hart LLP

(57) ABSTRACT

Methods, systems, and devices for wireless communications are described. A user equipment (UE) may be configured with a plurality of resources corresponding to a plurality of antenna elements of the network entity. The UE may measure signaling received via the antenna elements and over the resources to estimate a wireless channel for the plurality of antenna elements of the network entity. In some examples, the UE may determine the per-element wireless channel using the received signal and may report the per-element wireless channel. Additionally, after acquiring the per-element wireless channel, the UE may use joint optimization to calculate analog beams and corresponding digital beams for each antenna element of the network entity. For example, the UE may calculate an analog precoding matrix and a digital precoding matrix. The UE may transmit a report indicating the analog precoding matrix, the digital precoding matrix, channel quality information, or any combination thereof.

26 Claims, 10 Drawing Sheets

300

400

(56) References Cited

U.S. PATENT DOCUMENTS

| | | | | | |
|---|---|---|---|---|---|
| 11,146,369 | B2 * | 10/2021 | Park | | H04L 1/0026 |
| 11,271,625 | B2 | 3/2022 | Park et al. | | |
| 2017/0288758 | A1 * | 10/2017 | Kakishima | | H04B 7/04 |
| 2019/0020454 | A1 * | 1/2019 | Kim | | H04L 5/0048 |
| 2020/0136711 | A1 * | 4/2020 | Cao | | H04B 7/0626 |
| 2025/0132788 | A1 * | 4/2025 | Davydov | | H04B 7/0478 |

FOREIGN PATENT DOCUMENTS

| | | | | |
|---|---|---|---|---|
| WO | WO-2023201050 | A1 * | 10/2023 | H04W 24/10 |
| WO | WO-2024033900 | A1 * | 2/2024 | H04B 7/0456 |
| WO | WO-2024170645 | A1 * | 8/2024 | H04B 7/0478 |

* cited by examiner

Receive a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports

905

Transmit a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof

910

900

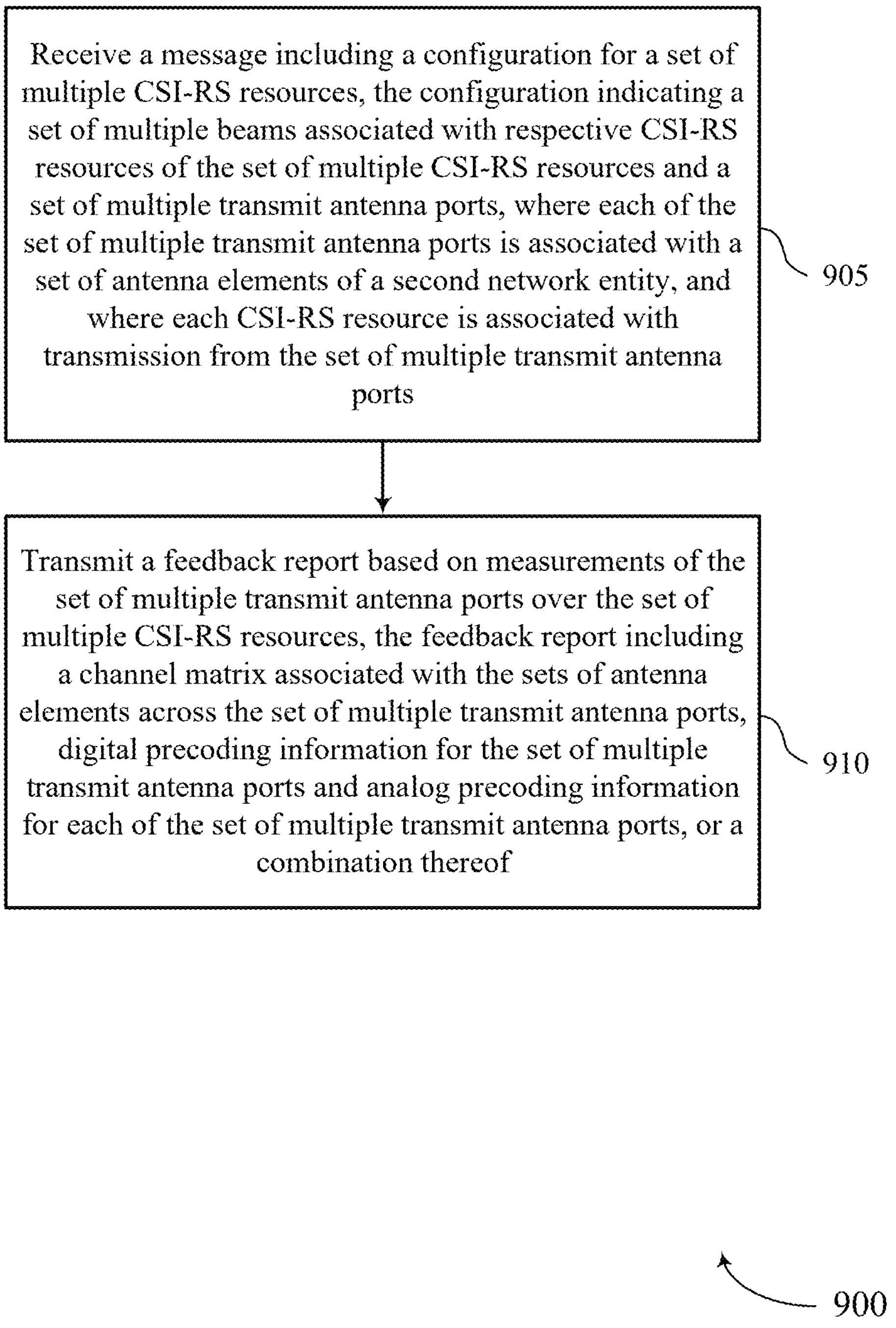

FIG. 9

Output, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports

1005

Obtain a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof

1010

1000

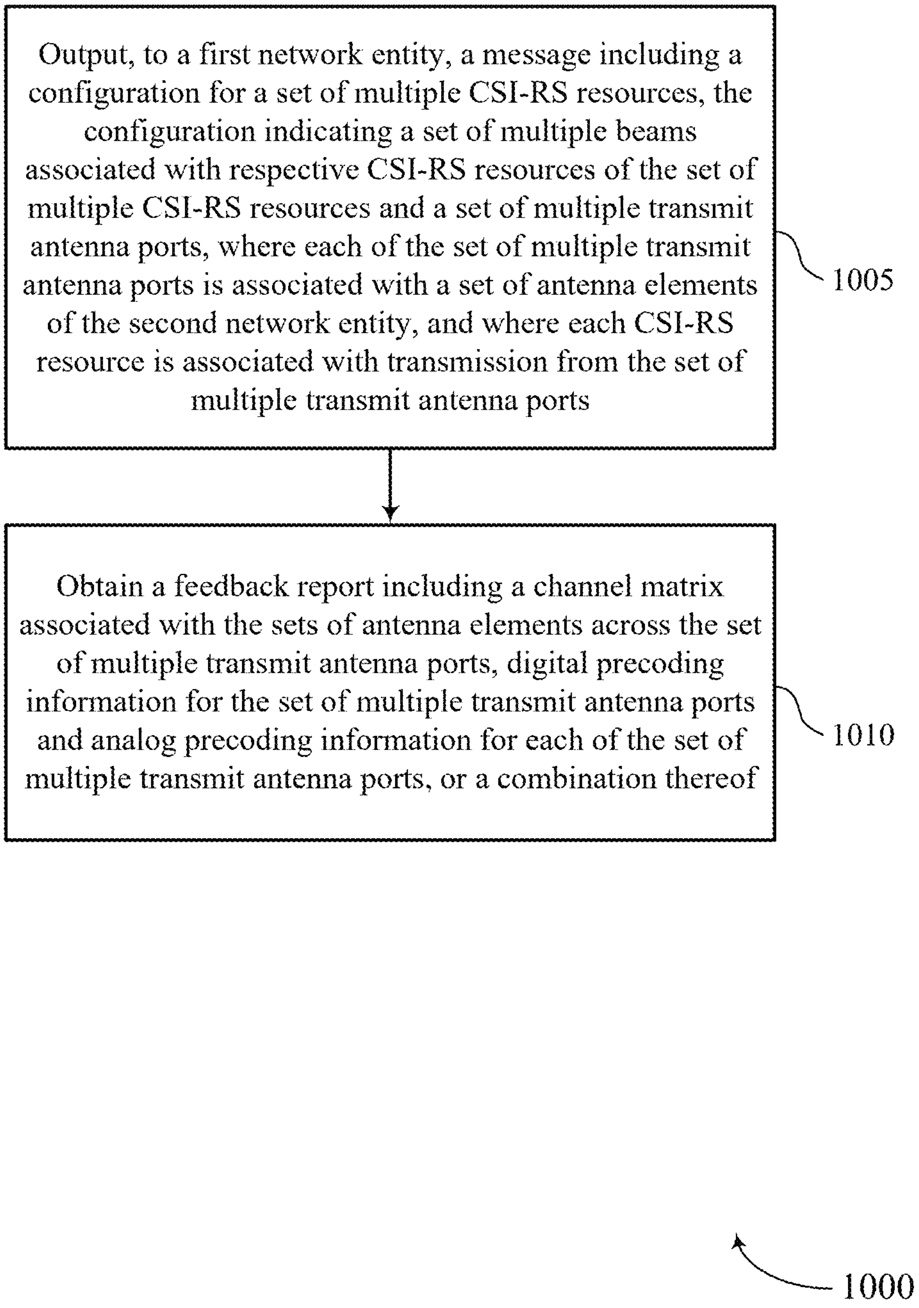

FIG. 10

CHANNEL ACQUISITION AND CHANNEL STATE FEEDBACK FOR ANALOG AND DIGITAL PRECODING USING JOINT OPTIMIZATION

FIELD OF TECHNOLOGY

The following relates to wireless communications, including channel acquisition and channel state feedback for analog and digital precoding using joint optimization.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The systems, methods, and devices of this disclosure each have several innovative aspects, no single one of which is solely responsible for the desirable attributes disclosed herein.

A method for wireless communications by a first network entity is described. The method may include receiving a message including a configuration for a set of multiple channel state information reference signal (CSI-RS) resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports and transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

A first network entity for wireless communications is described. The first network entity may include one or more memories storing processor executable code, and one or more processors coupled with the one or more memories. The one or more processors may individually or collectively be operable to execute the code to cause the first network entity to receive a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports and transmit a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Another first network entity for wireless communications is described. The first network entity may include means for receiving a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports and means for transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

A non-transitory computer-readable medium storing code for wireless communications is described. The code may include instructions executable by one or more processors to receive a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports and transmit a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Some examples of the method, first network entities, and non-transitory computer-readable medium described herein may further include operations, features, means, or instructions for estimating, based on the measurements of the set of multiple transmit antenna ports over the set of multiple CSI-RS resources, respective wireless channels associated with each of the set of antenna elements for the set of multiple transmit antenna ports.

In some examples of the method, first network entities, and non-transitory computer-readable medium described herein, receiving the message may include operations, features, means, or instructions for receiving an indication of an orthogonal basis associated with the set of multiple beams, where the first network entity estimates respective wireless channels associated with each of the set of antenna elements for the set of multiple transmit antenna ports based on applying the orthogonal basis across the measurements of the set of multiple transmit antenna ports over the set of multiple CSI-RS resources.

Some examples of the method, first network entities, and non-transitory computer-readable medium described herein may further include operations, features, means, or instructions for calculating an analog precoding matrix indicating a set of multiple analog beams for communications between the first network entity and the second network entity in accordance with a joint optimization operation, where each analog beam of the set of multiple analog beams may be associated with a respective transmit antenna port of the set of multiple transmit antenna ports and transmitting an indication of the analog precoding matrix, where the first network entity includes the indication of the analog precoding matrix in the feedback report.

In some examples of the method, first network entities, and non-transitory computer-readable medium described herein, calculating the analog precoding matrix may include operations, features, means, or instructions for calculating the analog precoding matrix based on a set of multiple principal eigenvectors associated with a set of multiple subchannel matrices, where each subchannel matrix of the set of multiple subchannel matrices may be associated with a respective transmit antenna port of the set of multiple transmit antenna ports and the set of antenna elements of the second network entity.

In some examples of the method, first network entities, and non-transitory computer-readable medium described herein, the analog precoding matrix may be a block diagonal matrix.

Some examples of the method, first network entities, and non-transitory computer-readable medium described herein may further include operations, features, means, or instructions for calculating a digital precoding matrix indicating a set of multiple digital beams for communications between the first network entity and the second network entity in accordance with a precoding optimization operation and channel quality information associated with the digital precoding matrix, where the digital precoding matrix may be associated with an analog-precoded channel and transmitting an indication of the digital precoding matrix, where the first network entity includes the indication of the digital precoding matrix, the channel quality information, or both, in the feedback report.

In some examples of the method, first network entities, and non-transitory computer-readable medium described herein, the first network entity may be a user equipment (UE), and the second network entity may be a base station.

A method for wireless communications by a second network entity is described. The method may include outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports and obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

A second network entity for wireless communications is described. The second network entity may include one or more memories storing processor executable code, and one or more processors coupled with the one or more memories. The one or more processors may individually or collectively be operable to execute the code to cause the second network entity to output, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports and obtain a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Another second network entity for wireless communications is described. The second network entity may include means for outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports and means for obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

A non-transitory computer-readable medium storing code for wireless communications is described. The code may include instructions executable by one or more processors to output, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports and obtain a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

In some examples of the method, second network entities, and non-transitory computer-readable medium described herein, outputting the message may include operations, features, means, or instructions for outputting an indication of an orthogonal basis associated with the set of multiple beams.

In some examples of the method, second network entities, and non-transitory computer-readable medium described herein, obtaining the feedback report may include operations, features, means, or instructions for obtaining an indication of an analog precoding matrix indicating a set of multiple analog beams for communications between the second network entity and the first network entity, where each analog beam of the set of multiple analog beams may be associated with a respective transmit antenna port of the set of multiple transmit antenna ports.

In some examples of the method, second network entities, and non-transitory computer-readable medium described herein, the analog channel matrix may be a block diagonal matrix.

In some examples of the method, second network entities, and non-transitory computer-readable medium described herein, obtaining the feedback report may include operations, features, means, or instructions for obtaining an indication of a digital precoding matrix, channel quality information associated with the digital precoding matrix, or both, where the digital precoding matrix indicates a set of multiple digital beams for communications between the second network entity and the first network entity in accordance with a precoding optimization operation.

In some examples of the method, second network entities, and non-transitory computer-readable medium described herein, the second network entity may be a base station, and the first network entity may be a UE.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 9 and 10 show flowcharts illustrating methods that support channel acquisition and CSF for analog and digital precoding using joint optimization in accordance with one or more aspects of the present disclosure.

DETAILED DESCRIPTION

Figure 1:
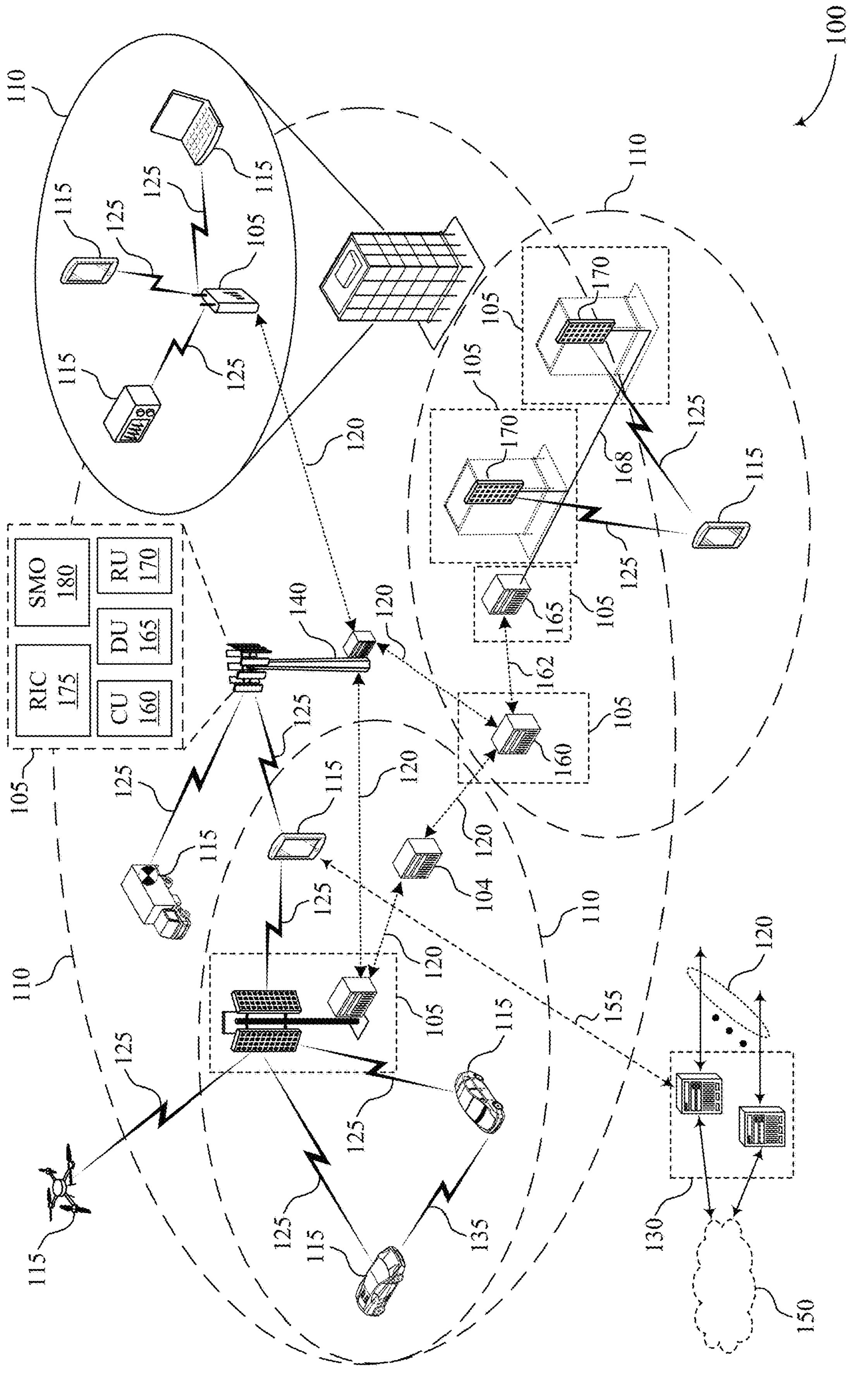
FIG. 1 shows an example of a wireless communications system that supports channel acquisition and channel state feedback (CSF) for analog and digital precoding using joint optimization in accordance with one or more aspects of the present disclosure.

In some wireless communications systems, wireless devices may communicate signaling in a frequency band via multiple antenna panels, where each antenna panel may include multiple antenna elements. To coordinate communications using the multiple antenna elements, wireless devices may implement beamforming. In some examples, wireless devices may implement analog beamforming over the multiple antenna elements of a given antenna panel and may implement digital beamforming over the multiple antenna panels. Using both analog beamforming and digital beamforming may be an example of hybrid beamforming (HBF).

Additionally, wireless devices may communicate over different frequency ranges (e.g., frequency bands), including the Frequency Range 1 (FR1) band, the Frequency Range 2 (FR2) band, and the Frequency Range 3 (FR3) band. Wireless devices communicating over FR2 may implement an analog-heavy HBF architecture, where a wireless device may include a small number of antenna panels each including a large number of antenna elements. Accordingly, wireless devices communicating over FR2 may implement beam-sweeping based beam management schemes to accommodate narrow analog beamforming. In some examples, wireless devices may communicate over FR3 to support high amounts of throughput and to mitigate challenging radio propagation conditions. Proposed HBF architectures for communications over FR3 may include a large number of antenna panels, where each antenna panel includes a small number of antenna elements. In such cases, it may be beneficial to implement a digital-heavy HBF architecture in the FR3 range to accommodate the large (total) number of antenna elements. Additionally, implementing the digital-heavy HBF architecture may improve frequency-selective digital precoding for the large number of antenna panels.

Various aspects of the present disclosure are related to channel acquisition and channel state feedback (CSF) for analog and digital precoding using joint optimization. In some examples, a network entity may configure a user equipment (UE) with multiple channel state information reference signal (CSI-RS) resources corresponding to multiple antenna elements of the network entity. The UE may estimate a per-element wireless channel for each antenna element of the network entity based on measuring the antenna elements over the CSI-RS resources. In some examples, the UE may report an indication of the wireless channel to the network entity. For example, the UE may calculate a channel matrix representing the wireless channel and may report a compressed channel matrix to the network entity. Additionally, or alternatively, after acquiring the per-element wireless channel, the UE may calculate a set of analog beams (e.g., best analog beams) for each antenna element of the network entity using joint optimization and a corresponding set of digital beams (e.g., best digital beams), for example, using singular value decomposition (SVD). In some examples, the UE may calculate an analog precoding matrix and a digital precoding matrix and may transmit a feedback report including an indication of the analog precoding matrix, the digital precoding matrix, channel quality information, or any combination thereof.

Aspects of the disclosure are initially described in the context of wireless communications systems. Aspects of the disclosure are additionally illustrated by and described with reference to process flows. Aspects of the disclosure are further illustrated by and described with reference to apparatus diagrams, system diagrams, and flowcharts that relate to channel acquisition and CSF for analog and digital precoding using joint optimization.

FIG. 1 shows an example of a wireless communications system 100 that supports channel acquisition and CSF for analog and digital precoding using joint optimization in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU

170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a network entity 105 may configure a UE 115 with a plurality of CSI-RS resources corresponding to a plurality of antenna elements of the network entity 105. The UE 115 may estimate a per-element wireless channel for each antenna element of the network entity 105 based on measuring the signal received via the antenna elements and over the CSI-RS resources. For example, the network entity 105 may apply an orthogonal basis to signaling communicated over the configured CSI-RS resources. The network entity 105 may indicate the orthogonal basis to the UE 115 via the configuration. In such cases, the UE 115 may determine the per-element wireless channel using the received signal and the orthogonal basis.

In some examples, the UE 115 may report an indication of the per-element wireless channel to the network entity 105. For example, the UE 115 may calculate a channel matrix representing the per-element wireless channel and may report a compressed channel matrix to the network entity 105. Additionally, or alternatively, after acquiring the per-element wireless channel, the UE 115 may calculate a set of analog beams (e.g., best analog beams) for each antenna element of the network entity 105 using joint optimization and a corresponding set of digital beams (e.g., best digital beams) using SVD. For example, the UE 115 may calculate an analog precoding matrix and a digital precoding matrix and may transmit a feedback report including an indication of the analog precoding matrix, the digital precoding matrix, channel quality information, or any combination thereof.

Figure 2:
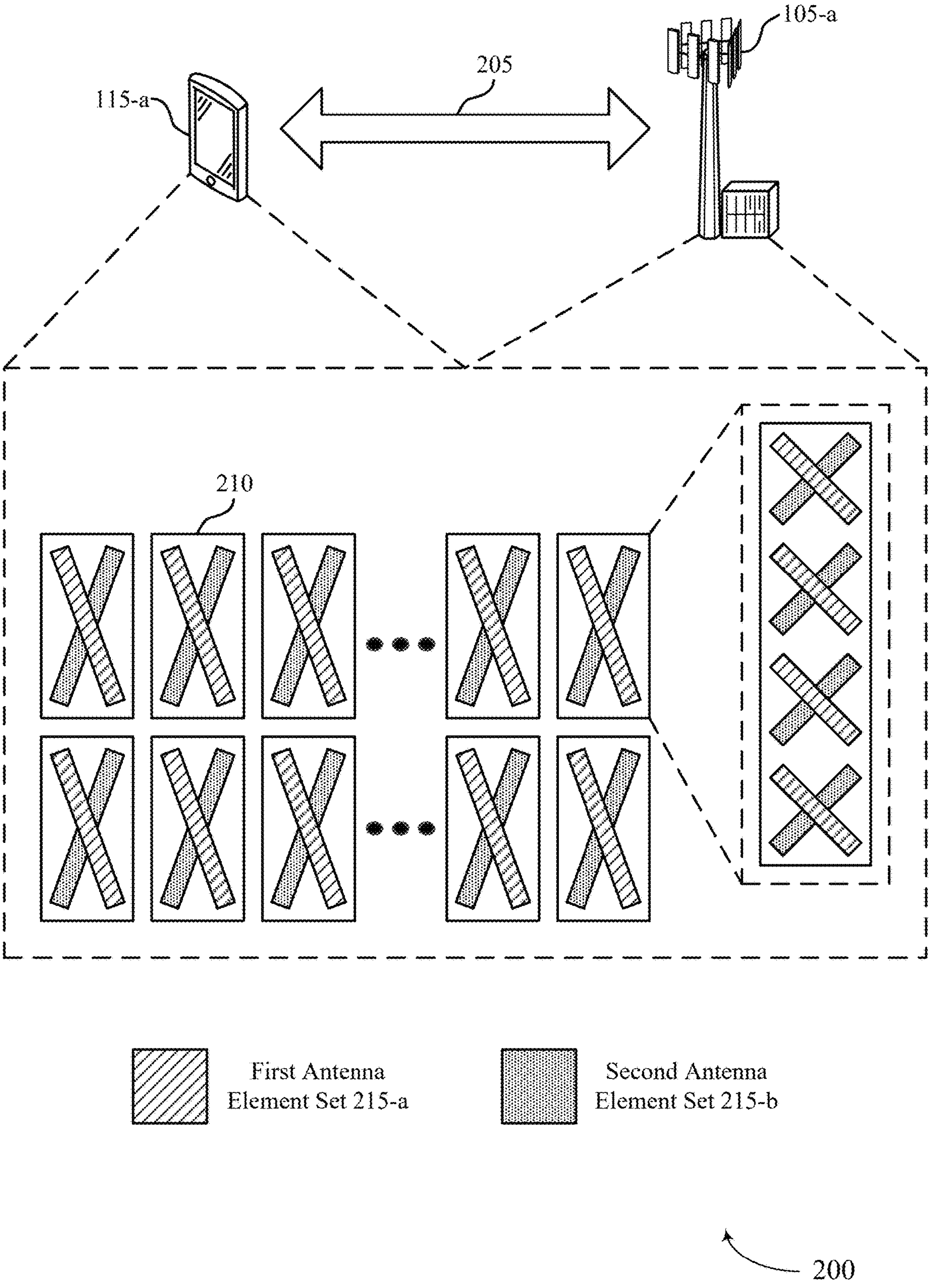
FIG. 2 shows an example of a wireless communications system that supports channel acquisition and CSF for analog and digital precoding using joint optimization in accordance with one or more aspects of the present disclosure.

FIG. 2 shows an example of a wireless communications system 200 that supports channel acquisition and CSF for analog and digital precoding using joint optimization in accordance with one or more aspects of the present disclosure. In some examples, the wireless communications system 200 may include a UE 115-*a* in communications with a network entity 105-*a*, which may be examples of corresponding devices as described herein, including with reference to FIG. 1. The UE 115-*a* and the network entity 105-*a* may communicate via a wireless channel 205. In some examples, the UE 115-*a* and the network entity 105-*a* may communicate in accordance with a frequency range. For example, the UE 115-*a* and the network entity 105-*a* may communicate via FR3, which supports frequencies between 7.125 GHz to 24.25 GHz. The FR3 band may be between Frequency Range 1 (FR1), which supports frequencies less than 6 GHZ), and Frequency Range 2 (FR2), which supports frequencies greater than 24 GHz. Communicating via the FR3 band may support improved throughput and improved resilience against challenging radio propagation conditions.

The UE 115-*a*, the network entity 105-*a*, or both, may communicate signaling via one or more antenna panels 210 (e.g., a transmission and reception unit (TXRU)). Each antenna panel 210 may include one or more antenna elements 215 (e.g., ports). In some examples, the antenna elements 215 may be cross-polarized. By implementing cross-polarization, the UE 115-*a*, the network entity 105-*a*, or both, may include multiple antenna elements 215 per port of each antenna panel 210. For example, an antenna panel 210 may include a first set of antenna elements 215-*a* and a second set of antenna elements 215-*b* that are orthogonal to the first set of antenna elements 215-*a*.

The UE 115-*a*, the network entity 105-*a*, or both, may implement beamforming to coordinate transmissions from the multiple antenna elements 215. For example, the UE 115-*a*, the network entity 105-*a*, or both, may implement analog beamforming, digital beamforming, or both (e.g., hybrid beamforming). In analog beamforming, a receiving device (e.g., the UE 115-*a*, the network entity 105-*a*) may receive multiple analog signals and may apply a phase shift to each analog signal, may scale each analog signal, or both. The receiving device may process each analog signal using circuitry (e.g., an amplifier, a phase shifter) corresponding to the antenna element 215 that received the analog signal. Afterwards, the receiving device may sum the analog signals to receive an original signal from a transmitting device (e.g., the network entity 105-*a*, the UE 115-*a*). Analog beamforming with a large number of antenna elements 215 may incur large power costs at the receiving device. In digital beamforming, the receiving device may digitize the multiple analog signals and may digitally process and sum the signals to receive the original signal. Digital beamforming with a large number of antenna elements 215 may introduce significant computational complexity to the receiving device.

In the example of FIG. 2, the UE 115-*a* and the network entity 105-*a* may implement hybrid beamforming. In some cases where the UE 115-*a* and the network entity 105-*a* communicate via FR3, hybrid beamforming architecture may be defined as digital-heavy. For example, a digital-heavy hybrid beamforming architecture may include a large number of antenna panels 210 relative to an analog-heavy architecture (e.g., operating in FR2), where each antenna panel 210 has a small number of antenna elements 215. In FIG. 2, the UE 115-*a* and the network entity 105-*a* may be configured with two rows of 32 antenna panels 210, for a total of 64 antenna panels 210. Each antenna panel 210 may include four antenna elements 215, for a total of 256 antenna elements 215 distributed across the 64 antenna panels 210. A transmitting device (e.g., the network entity 105-*a*) may perform analog beamforming on the four antenna elements 215 per antenna panel 210 and may perform digital beamforming on the 64 antenna panels 210.

In other examples, the hybrid beamforming architecture may be analog-heavy. In some examples, the UE 115-*a* and the network entity 105-*a* may be configured with analog-heavy beamforming architecture to communicate via FR2. For example, the UE 115-*a* and the network entity 105-*a* may be configured with two rows of two antenna panels 210, for a total of four antenna panels 210. Each antenna panel 210 may include 64 antenna elements 215, for a total of 256 antenna elements distributed across the four antenna panels 210. A transmitting device (e.g., the network entity 105-*a*) may perform analog beamforming on the 64 antenna elements 215 per antenna panel 210 and may perform digital beamforming on the four antenna panels 210. With analog-heavy hybrid beamforming, beam-sweeping of analog beams may be performed to identify suitable analog beams because of the narrow beamwidth of the analog beams.

To fully utilize the digital-heavy hybrid beamforming architecture and capitalize on the FR3 band, the UE 115-*a* and the network entity 105-*a* may support or otherwise implement techniques for improved channel acquisition and CSF reporting. In some examples, a transmitting device (e.g., the network entity 105-*a*), may perform channel acquisition for each antenna element 215 (e.g., per-element MIMO channel acquisition) over which the transmitting device transmits signaling (e.g., reference signaling) to the receiving device (e.g., the UE 115-*a*). Additionally, the receiving device may implement joint optimization procedures for precoding (e.g., analog precoding, digital precoding). For example, the receiving device may transmit feedback (e.g., a feedback report) indicating precoding information and channel state information to the transmitting device. In the example of FIG. 2, the network entity 105-*a* may be the transmitting device, and the UE 115-*a* may be a receiving device. In some other examples, the UE 115-*a* may be the transmitting device, and the network entity 105-*a* may be the receiving device.

Figure 3:
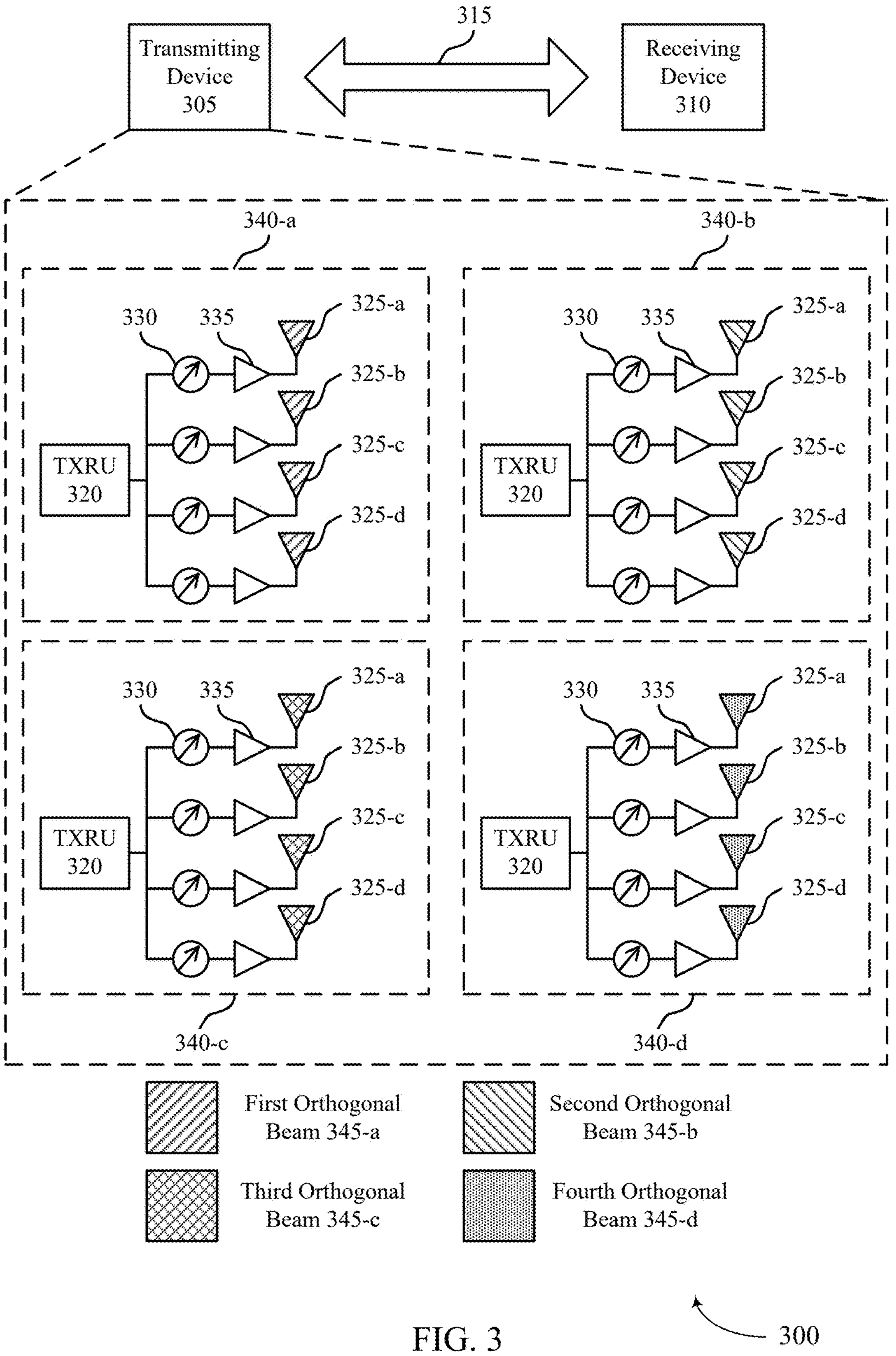
FIG. 3 shows an example of a wireless communications system that supports channel acquisition and CSF for analog and digital precoding using joint optimization in accordance with one or more aspects of the present disclosure.

FIG. 3 shows an example of a wireless communications system 300 that supports channel acquisition and CSF for analog and digital precoding using joint optimization in accordance with one or more aspects of the present disclosure. In some examples, the wireless communications system 300 may include a transmitting device 305 and a receiving device 310, which may be examples of corresponding devices as described herein, including with reference to FIGS. 1 and 2. In the example of FIG. 3, the transmitting device 305 may be a network entity, and the receiving device 310 may be a UE. Alternatively, the transmitting device may be a UE, and the receiving device 310 may be a network entity. The transmitting device 305 and the receiving device 310 may communicate signaling via communication link 315.

The transmitting device 305 may include one or more TXRUs 320, where each TXRU is associated with a respective antenna panel, each of which may include multiple antenna elements 325 (e.g., antenna ports). In the example of FIG. 3, one TXRU 320 is shown, but the transmitting device 305 may be configured with additional TXRUs 320 that are not shown. For example, the TXRU 320 in FIG. 3 may be associated with one of 64 antenna panels of the transmitting device 305, and the TXRU 320 may be connected with an antenna panel that includes four antenna elements 325 (e.g., a first antenna element 325-*a*, a second antenna element 325-*b*, a third antenna element 325-*c*, and a fourth antenna element 325-*d*), as described with reference to FIG. 2. Each antenna element 325 may be coupled with a phase shifter 330 and an amplifier 335.

In some examples, the transmitting device 305 may transmit reference signaling via the antenna elements 325 to the receiving device 310 as a part of a channel acquisition procedure. For example, the transmitting device 305 may transmit a quantity of channel state information reference signals (CSI-RS) to the receiving device 310 via a corresponding quantity of CSI-RS resources 340. In certain examples where the transmitting device 305 is a UE, the UE may transmit a sounding reference signal (SRS) to the receiving device 310 (e.g., a network entity). The transmitting device 305 may configure the receiving device 310 with a set of multiple CSI-RS resources 340. The multiple CSI-RS resources 340 may be multiplexed in the time division (e.g., TDMed). In some examples, the quantity of CSI-RS resources configured for the receiving device 310 may be the same as the quantity of antenna elements 325 per TXRU 320. For example, in FIG. 3, the transmitting device 305 includes four antenna elements 325 per TXRU 320 and may accordingly configure the receiving device 310 with four CSI-RS resources 340 (e.g., a first CSI-RS resource 340-*a*, a second CSI-RS resource 340-*b*, a third CSI-RS resource 340-*c*, and a fourth CSI-RS resource 340-*d*). The transmitting device 305 may transmit the CSI-RSs to the receiving device 310 via the multiple CSI-RS resources 340. For each CSI-RS resource 340, each TXRU 320 may transmit CSI-RS (e.g., a portion of the CSI-RS) via different resources (e.g., different frequency resources) assigned to different antenna ports (e.g., where each TXRU 320 may be assigned to a different antenna port).

In some cases, the transmitting device 305 may selectively activate and deactivate the antenna elements 325 of the TXRU 320 for each CSI-RS resource 340. For example, the transmitting device 305 may activate the first antenna element 325-*a* and may deactivate the second antenna element 325-*b*, the third antenna element 325-*c*, and the fourth antenna element 325-*d*, for the first CSI-RS resource 340-*a*. Similarly, the transmitting device 305 may activate the second antenna element 325-*b* and may deactivate the first antenna element 325-*a*, the third antenna element 325-*c*, and the fourth antenna element 325-*d*, for the second CSI-RS resource 340-*b*. The receiving device 310 may measure the active antenna elements 325 for each TXRU 320 to determine each per-element wireless channel for each active antenna element 325.

Alternatively, the transmitting device 305 may apply an orthogonal analog beam for each CSI-RS resource 340. For example, the transmitting device 305 may apply a first orthogonal beam 345-*a* to signaling transmitted via the first CSI-RS resource 340-*a*, may apply a second orthogonal beam 345-*b* to signaling transmitted via the second CSI-RS resource 340-*b*, may apply a third orthogonal beam 345-*c* to signaling transmitted via the third CSI-RS resource 340-*c*, and may apply a fourth orthogonal beam 345-*d* to signaling transmitted via the fourth CSI-RS resource 340-*d*. The transmitting device may apply the orthogonal beams 345 to all antenna elements 325 of a corresponding TXRU 320. The transmitting device 305 may indicate the orthogonal beams 345 to the receiving device 310. In some examples, the transmitting device 305 may include an indication of an orthogonal basis in the CSI-RS resource configuration for the receiving device 310 to apply across the CSI-RS resources 340.

In some cases where the receiving device 310 is aware of the orthogonal basis associated with signaling from the transmitting device 305 (e.g., the receiving device 310 receives the configuration indicating the orthogonal basis), the receiving device may perform per-element MIMO channel acquisition using the orthogonal basis. In some examples, the receiving device 310 may measure the received signal R over each CSI-RS resource 340 to estimate wireless channels associated with the antenna elements 325 of the transmitting device 305. The received signal R with respect to CSI-RS measurements may be written as Equation 1 below.

$$R=[Hb_0, Hb_1, Hb_2, Hb_3]=HB \quad (1)$$

H may be a matrix (e.g., a channel matrix) representing the wireless channel between the antenna elements 325 of the transmitting device 305 and the antenna elements 325 of the receiving device 310. In some examples, a channel matrix may represent the wireless channel per antenna element 325 of the transmitting device 305. For example, the channel matrix H may represent a K×MN per-element channel matrix, where K is a quantity of antenna elements 325 of the receiving device 310, N is a quantity of TXRUs 320 of the transmitting device 305, and M is a quantity of antenna elements 325 per TXRU 320 of the transmitting device 305. Each element of the channel matrix H may represent a channel measurement associated with a pair of TXRUs (e.g., a transmitting TXRU 320 of the transmitting device 305 and a receiving TXRU 320 of the receiving device 310). B may be a matrix representing the orthogonal basis. The transmitting device 305 may calculate B in accordance with Equation 2 below.

$$BB^H = I \quad (2)$$

$B^H$ may represent a conjugate transpose of B, and I may represent the identity matrix. Each column of B may represent an orthogonal beam 345 associated with a CSI-RS resource 340. For example, $b_0$ may correspond to the first orthogonal beam 345-*a*, $b_1$ may correspond to the second orthogonal beam 345-*b*, $b_2$ may correspond to the third orthogonal beam 345-*c*, and $b_3$ may correspond to the fourth orthogonal beam 345-*d*.

If the receiving device 310 is configured to transmit a channel report (e.g., a CSF report), the receiving device 310 may determine the per-element wireless channel by calculating the matrix H using the received signal R and the orthogonal basis B in accordance with Equation 1. For example, the receiving device 310 may calculate the H matrix and may transmit a feedback report indicating the channel information (e.g., channel matrix H) to the transmitting device 305. In some cases, the receiving device 310 may compress the H matrix before reporting the channel information.

In some examples, the receiving device 310 may use the calculated H matrix to perform joint optimization on the received signal R and to maximize spectral efficiency within the wireless communications system 300. For example, the receiving device 310 may calculate an analog precoding matrix A (e.g., a best analog precoding matrix A) and a digital precoding matrix $W_D$ (e.g., a best digital precoding matrix $W_D$) for the received signal R over the wireless channel H. In some examples, the received signal of a data channel may be represented by y in Equation 3 below.

$$y = HAW_Ds + n \quad (3)$$

The product $HAW_DS$ may represent an inputted signal (e.g., an original signal) transmitted from the transmitting device 305, and n may represent noise associated with the received signal y. As described herein, H may represent the K×MN per-element channel matrix. A may represent the analog precoding matrix, and $W_D$ may represent a N×L digital precoding matrix, where N is the quantity of a TXRU 320 of the transmitting device 305, and L is a quantity of layers associated with data transmission. In some examples, A may have a block diagonal structure. For example, A may be defined by Equation 4 below.

$$A = \begin{bmatrix} \phi_1 & 0 & \dots & 0 \\ 0 & \phi_2 & \dots & 0 \\ \vdots & \vdots & \ddots & \vdots \\ 0 & 0 & \dots & \phi_N \end{bmatrix} \quad (4)$$

In Equation 4, On may represent an M×1 analog beam for an n-th TXRU 320, where M is the quantity of antenna elements 325 per TXRU 320 of the transmitting device 305. The receiving device 310 may determine $\phi_n$ such that the amplitude of each analog beam $|\phi_{n,m}|=1$.

To improve the spectral efficiency of communications over the wireless channel H, the receiving device 310 may optimize both analog precoding (e.g., the analog precoding matrix A) and digital precoding (e.g., the digital precoding matrix $W_D$) using joint optimization. For example, the receiving device 310 may determine one or more analog beams $\widehat{\phi_n}$ (e.g., one or more best analog beams $\widehat{\phi_n}$) for the N TXRUs 320 of the transmitting device 305 in accordance with Equation 5 below.

$$\max_{A,W_D} \log_2\left(\left|I + \rho HAW_DW_D^HA^HH^H\right|\right) \quad (5)$$

ρ may represent a SNR associated with the received signal y, and |·| may represent the determinant operation of a matrix. In some examples, Equation 5 may be approximated as Equation 6, which may be further simplified to Equation 7 in cases where $W_D$ is the right singular matrix for the matrix HA, where $\|\cdot\|_F$ may represent the Frobenius norm operator.

$$\max_{A,W_D} \|HAW_D\|_F^2 \quad (6)$$

$$\max_A \|HA\|_F^2 \quad (7)$$

Because A is a block diagonal matrix, the product $$\|HA\|_F^2$$

in Equation 7 may be simplified to Equation 8, which may be further simplified to Equation 9 below.

$$\|HA\|_F^2 \left\| [H_1 \; H_2 \; \dots \; H_N] \begin{bmatrix} \phi_1 & 0 & \dots & 0 \\ 0 & \phi_2 & \dots & 0 \\ \vdots & \vdots & \ddots & \vdots \\ 0 & 0 & \dots & \phi_N \end{bmatrix} \right\|_F^2 \quad (8)$$

$$\|HA\|_F^2 = \|[H_1\phi_1 \; H_2\phi_2 \; \dots \; H_N\phi_N]\|_F^2 = \sum_{n-1}^{N} \|H_n\phi_n\|_F^2 \quad (9)$$

$H_n$ may represent an n-th K×M sub-channel matrix (e.g., subblock channel matrix) from the n-th TXRU 320 of the transmitting device 305 to the antenna elements 325 of the receiving device 310. The result of Equation 9 may be substituted into Equation 7 to arrive at Equation 10 below.

$$\max_{\phi_n} |H_n\phi_n|^2 = \max_{\phi_n} \phi_n^H H_n^H H_n \phi_n \quad (10)$$

Equation 10 may be defined such that the amplitude of each analog beam $|\phi_{n,m}|=1$. The receiving device 310 may calculate the analog beams $\widehat{\phi_n}$ in accordance with Equation 11 below.

$$\widehat{\phi_n} = e^{j\,angle(v_1)} \quad (11)$$

In Equation 11, $v_1$ may be a principal eigenvector of the product $$H_n^H H_n.$$

After calculating the analog beams $\widehat{\phi_n}$, the receiving device 310 may determine the corresponding optimized analog precoding matrix Â (e.g., the best analog precoding matrix Â), which may be defined by Equation 12 below.

$$\hat{A} = \begin{bmatrix} \widehat{\phi_1} & 0 & \dots & 0 \\ 0 & \widehat{\phi_2} & \dots & 0 \\ \vdots & \vdots & \ddots & \vdots \\ 0 & 0 & \dots & \hat{\phi}_N \end{bmatrix} \quad (12)$$

The receiving device 310 may determine the optimized analog precoding matrix Â based on optimized analog beams Øn calculated for each TXRU 320 of the transmitting device 305. With the optimized analog precoding matrix Â, the receiving device 310 may also calculate the analog precoded channel HÂ. In some examples, the receiving device 310 may also determine channel information for the analog precoded channel HÂ. In some examples, after determining the analog precoding channel HÂ, the receiving device may determine the digital precoding matrix $W_D$ (e.g., the best digital precoding matrix $W_D$, such as an SVD precoding matrix) in accordance with Equation 3. For example, the receiving device 310 may further determine a rank indicator (RI) of the digital precoding matrix $W_D$, a PMI for the digital precoding matrix $W_D$, a channel quality indicator (CQI) for the analog precoded channel HÂ and the digital precoding matrix $W_D$, or any combination thereof.

The receiving device 310 may transmit a CSF report to the transmitting device 305. In some examples, the CSF report may include analog precoding information (e.g., optimized analog precoding matrix Â), digital precoding information (e.g., RI and PMI of the digital precoding matrix $W_D$), channel quality information for the wireless channel H, or any combination thereof. In some cases, the receiving device 310 may quantize the analog precoding information before including the analog precoding information in the CSF report. For example, the receiving device 310 may quantize the optimized analog precoding matrix Â before transmitting the CSF report. The receiving device 310 may include the RI, the PMI, the CQI, or any combination thereof, in the CSF report.

Figure 4:
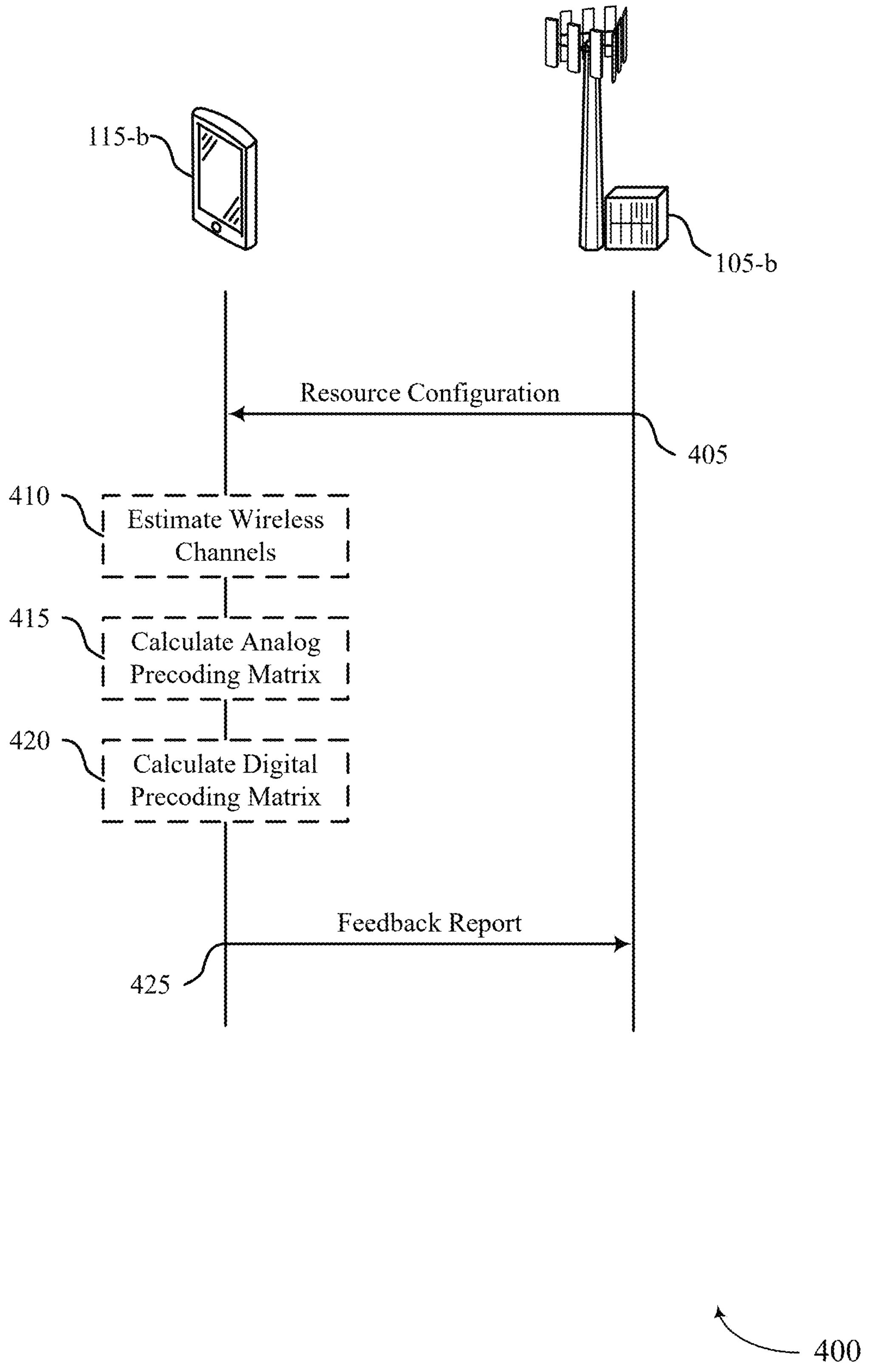
FIG. 4 shows an example of a process flow that supports channel acquisition and CSF for analog and digital precoding using joint optimization in accordance with one or more aspects of the present disclosure.

FIG. 4 shows an example of a process flow 400 that supports channel acquisition and CSF for analog and digital precoding using joint optimization in accordance with one or more aspects of the present disclosure. The process flow 400 may implement or be implemented by aspects of the wireless communications system 100, the wireless communications system 200, and the wireless communications system 300, as described with reference to FIGS. 1-3. For example, the process flow 400 illustrates actions performed by a UE 115-*b* and a network entity 105-*b*, which may be examples of corresponding devices described herein, including with reference to FIGS. 1-3. In the following description of the process flow 400, the operations between the UE 115-*b* and the network entity 105-*b* may be performed in a different order than the example shown, or the operations between the UE 115-*b* and the network entity 105-*b* may be performed in different orders at different times. Some operations may also be omitted from the process flow 400, and other operations may be added to the process flow 400. In the example of FIG. 4, the network entity 105-*b* may be a base station. However, in some other examples, the UE 115-*b* may be a base station, and the network entity 105-*b* may be a UE.

At 405, the UE 115-*b* may receive a message including a configuration for a plurality of CSI-RS resources. The configuration may indicate a plurality of beams associated with respective CSI-RS resources of the plurality of CSI-RS resources and a plurality of transmit antenna ports. In some examples, each of the plurality of transmit antenna ports may be associated with a set of antenna elements of the network entity 105-*b*. Additionally, each CSI-RS resource may be associated with transmission from the plurality of transmit antenna ports. In some cases, the UE 115-*b* may also receive an indication of an orthogonal basis associated with the plurality of beams. The network entity 105-*b* may include the indication in the message.

At 410, the UE 115-*b* may estimate, based on measurements of the plurality of transmit antenna ports over the plurality of CSI-RS resources, respective wireless channels associated with each of the set of antenna elements for the plurality of transmit antenna ports. In some examples, the UE 115-*b* may estimate the respective wireless channels associated with each of the set of antenna elements for the plurality of transmit antenna ports based on applying the orthogonal basis across the measurements of the plurality of transmit antenna ports over the plurality of CSI-RS resources.

At 415, the UE 115-*b* may calculate an analog precoding matrix indicating a plurality of analog beams for communications between the UE 115-*b* and the network entity 105-*b* in accordance with a joint optimization operation. The analog precoding matrix may be a block diagonal matrix. In some examples, each analog beam of the plurality of analog beams may be associated with a respective transmit antenna port of the plurality of transmit antenna ports. In some cases, the UE 115-*b* may calculate the analog precoding matrix based on a plurality of principal eigenvectors associated with a plurality of subchannel matrices. Each subchannel matrix of the plurality of subchannel matrices may be associated with a respective transmit antenna port of the plurality of transmit antenna ports and the set of antenna elements of the network entity 105-*b*.

At 420, the UE 115-*b* may calculate a digital precoding matrix indicating a plurality of digital beams for communications between the UE 115-*b* and the network entity 105-*b* in accordance with a precoding optimization operation and channel quality information associated with the digital precoding matrix. The digital precoding matrix may be associated with an analog-precoded channel.

At 425, the UE 115-*b* may transmit a feedback report based on the measurements of the plurality of transmit antenna ports over the plurality of CSI-RS resources. The feedback report may include a channel matrix associated with the sets of antenna elements across the plurality of transmit antenna ports, digital precoding information for the plurality of transmit antenna ports and analog precoding information for each of the plurality of transmit antenna ports, or a combination thereof. The UE 115-*b* may include the indication of the analog precoding matrix, the indication of the digital precoding matrix, the channel quality information, or both, in the feedback report.

Figure 5:
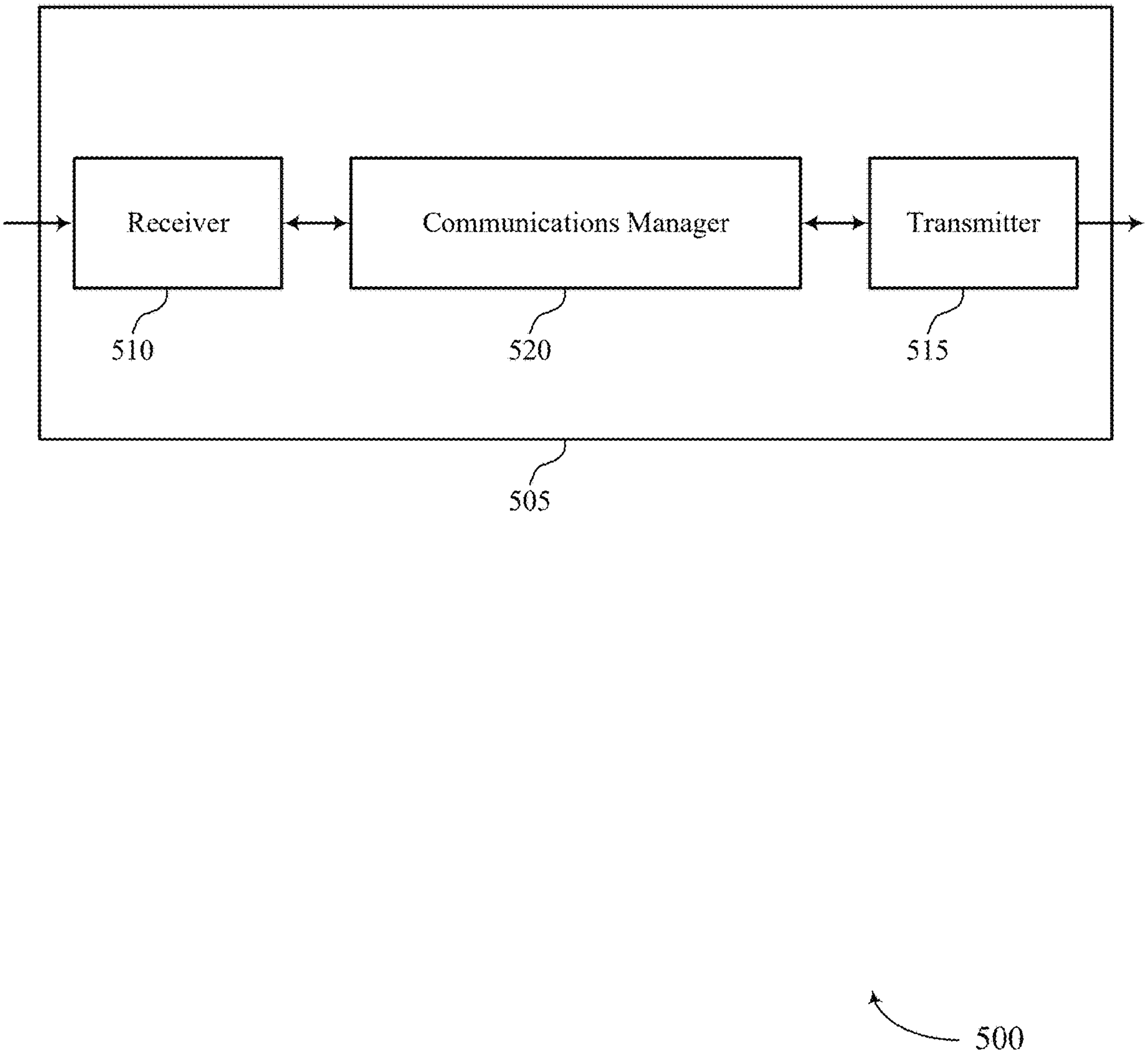
FIGS. 5 and 6 show block diagrams of devices that support channel acquisition and CSF for analog and digital precoding using joint optimization in accordance with one or more aspects of the present disclosure.

FIG. 5 shows a block diagram 500 of a device 505 that supports channel acquisition and CSF for analog and digital precoding using joint optimization in accordance with one or more aspects of the present disclosure. The device 505 may be an example of aspects of a network entity 105 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations or components thereof may be examples of means for performing various aspects of channel acquisition and CSF for analog and digital precoding using joint optimization as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports. The communications manager 520 is capable of, configured to, or operable to support a means for transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Additionally, or alternatively, the communications manager 520 may support wireless communications in accordance with examples as disclosed herein. For example, the communications manager 520 is capable of, configured to, or operable to support a means for outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports. The communications manager 520 is capable of, configured to, or operable to support a means for obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for reduced processing and reduced power consumption.

Figure 6:
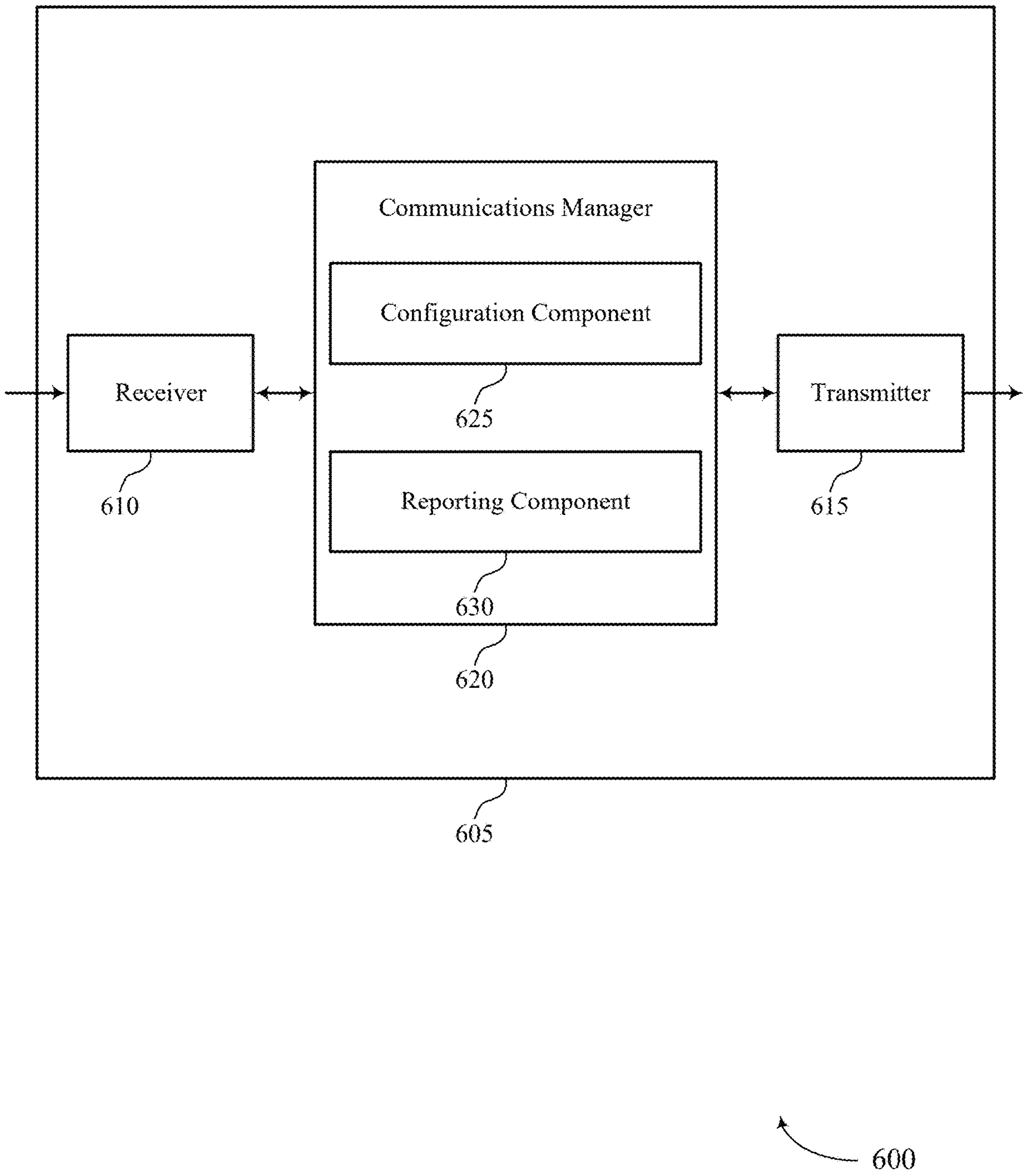

FIG. 6 shows a block diagram 600 of a device 605 that supports channel acquisition and CSF for analog and digital precoding using joint optimization in accordance with one or more aspects of the present disclosure. The device 605 may be an example of aspects of a device 505 or a network entity 105 as described herein. The device 605 may include a receiver 610, a transmitter 615, and a communications manager 620. The device 605, or one or more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of channel acquisition and CSF for analog and digital precoding using joint optimization as described herein. For example, the communications manager 620 may include a configuration component 625 a reporting component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The configuration component 625 is capable of, configured to, or operable to support a means for receiving a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports. The reporting component 630 is capable of, configured to, or operable to support a means for transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Additionally, or alternatively, the communications manager 620 may support wireless communications in accordance with examples as disclosed herein. The configuration component 625 is capable of, configured to, or operable to support a means for outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports. The reporting component 630 is capable of, configured to, or operable to support a means for obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Figure 7:
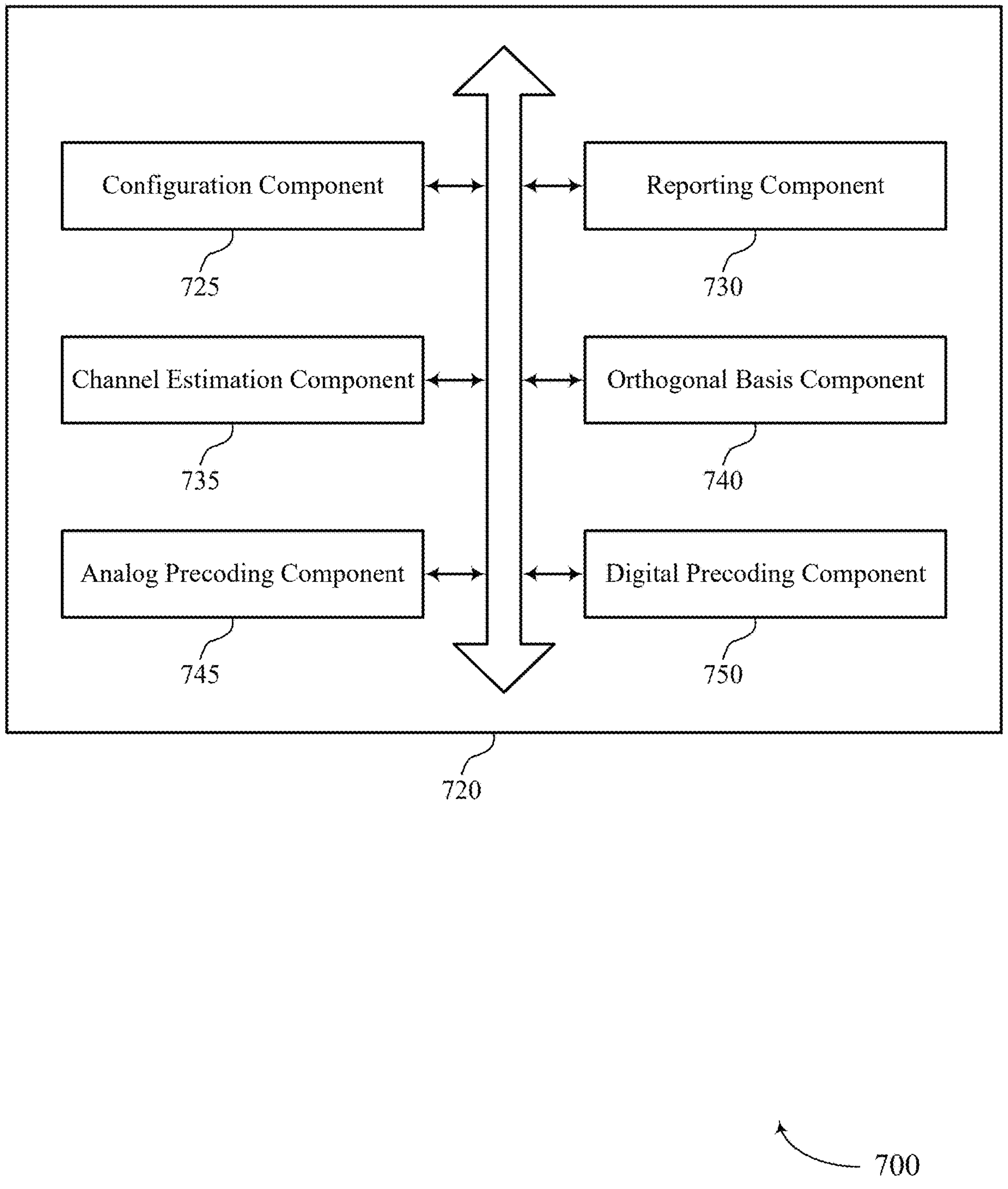
FIG. 7 shows a block diagram of a communications manager that supports channel acquisition and CSF for analog and digital precoding using joint optimization in accordance with one or more aspects of the present disclosure.

FIG. 7 shows a block diagram 700 of a communications manager 720 that supports channel acquisition and CSF for analog and digital precoding using joint optimization in accordance with one or more aspects of the present disclosure. The communications manager 720 may be an example of aspects of a communications manager 520, a communications manager 620, or both, as described herein. The communications manager 720, or various components thereof, may be an example of means for performing various aspects of channel acquisition and CSF for analog and digital precoding using joint optimization as described herein. For example, the communications manager 720 may include a configuration component 725, a reporting component 730, a channel estimation component 735, an orthogonal basis component 740, an analog precoding component 745, a digital precoding component 750, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications in accordance with examples as disclosed herein. The configuration component 725 is capable of, configured to, or operable to support a means for receiving a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports. The reporting component 730 is capable of, configured to, or operable to support a means for transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

In some examples, the channel estimation component 735 is capable of, configured to, or operable to support a means for estimating, based on the measurements of the set of multiple transmit antenna ports over the set of multiple CSI-RS resources, respective wireless channels associated with each of the set of antenna elements for the set of multiple transmit antenna ports.

In some examples, to support receiving the message, the orthogonal basis component 740 is capable of, configured to, or operable to support a means for receiving an indication of an orthogonal basis associated with the set of multiple beams, where the first network entity estimates respective wireless channels associated with each of the set of antenna elements for the set of multiple transmit antenna ports based on applying the orthogonal basis across the measurements of the set of multiple transmit antenna ports over the set of multiple CSI-RS resources.

In some examples, the analog precoding component 745 is capable of, configured to, or operable to support a means for calculating an analog precoding matrix indicating a set of multiple analog beams for communications between the first network entity and the second network entity in accordance with a joint optimization operation, where each analog beam of the set of multiple analog beams is associated with a respective transmit antenna port of the set of multiple transmit antenna ports. In some examples, the reporting component 730 is capable of, configured to, or operable to support a means for transmitting an indication of the analog precoding matrix, where the first network entity includes the indication of the analog precoding matrix in the feedback report.

In some examples, to support calculating the analog precoding matrix, the analog precoding component 745 is capable of, configured to, or operable to support a means for calculating the analog precoding matrix based on a set of multiple principal eigenvectors associated with a set of multiple subchannel matrices, where each subchannel matrix of the set of multiple subchannel matrices is associated with a respective transmit antenna port of the set of multiple transmit antenna ports and the set of antenna elements of the second network entity.

In some examples, the analog precoding matrix is a block diagonal matrix.

In some examples, the digital precoding component 750 is capable of, configured to, or operable to support a means for calculating a digital precoding matrix indicating a set of multiple digital beams for communications between the first network entity and the second network entity in accordance with a precoding optimization operation and channel quality information associated with the digital precoding matrix, where the digital precoding matrix is associated with an analog-precoded channel. In some examples, the reporting component 730 is capable of, configured to, or operable to support a means for transmitting an indication of the digital precoding matrix, where the first network entity includes the indication of the digital precoding matrix, the channel quality information, or both, in the feedback report.

In some examples, the first network entity is a user equipment, and the second network entity is a base station.

Additionally, or alternatively, the communications manager 720 may support wireless communications in accordance with examples as disclosed herein. In some examples, the configuration component 725 is capable of, configured to, or operable to support a means for outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports. In some examples, the reporting component 730 is capable of, configured to, or operable to support a means for obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

In some examples, to support outputting the message, the orthogonal basis component 740 is capable of, configured to, or operable to support a means for outputting an indication of an orthogonal basis associated with the set of multiple beams.

In some examples, to support obtaining the feedback report, the analog precoding component 745 is capable of, configured to, or operable to support a means for obtaining an indication of an analog precoding matrix indicating a set of multiple analog beams for communications between the second network entity and the first network entity, where each analog beam of the set of multiple analog beams is associated with a respective transmit antenna port of the set of multiple transmit antenna ports.

In some examples, the analog channel matrix is a block diagonal matrix.

In some examples, to support obtaining the feedback report, the digital precoding component 750 is capable of, configured to, or operable to support a means for obtaining an indication of a digital precoding matrix, channel quality information associated with the digital precoding matrix, or both, where the digital precoding matrix indicates a set of multiple digital beams for communications between the second network entity and the first network entity in accordance with a precoding optimization operation.

In some examples, the second network entity is a base station, and the first network entity is a user equipment.

Figure 8:
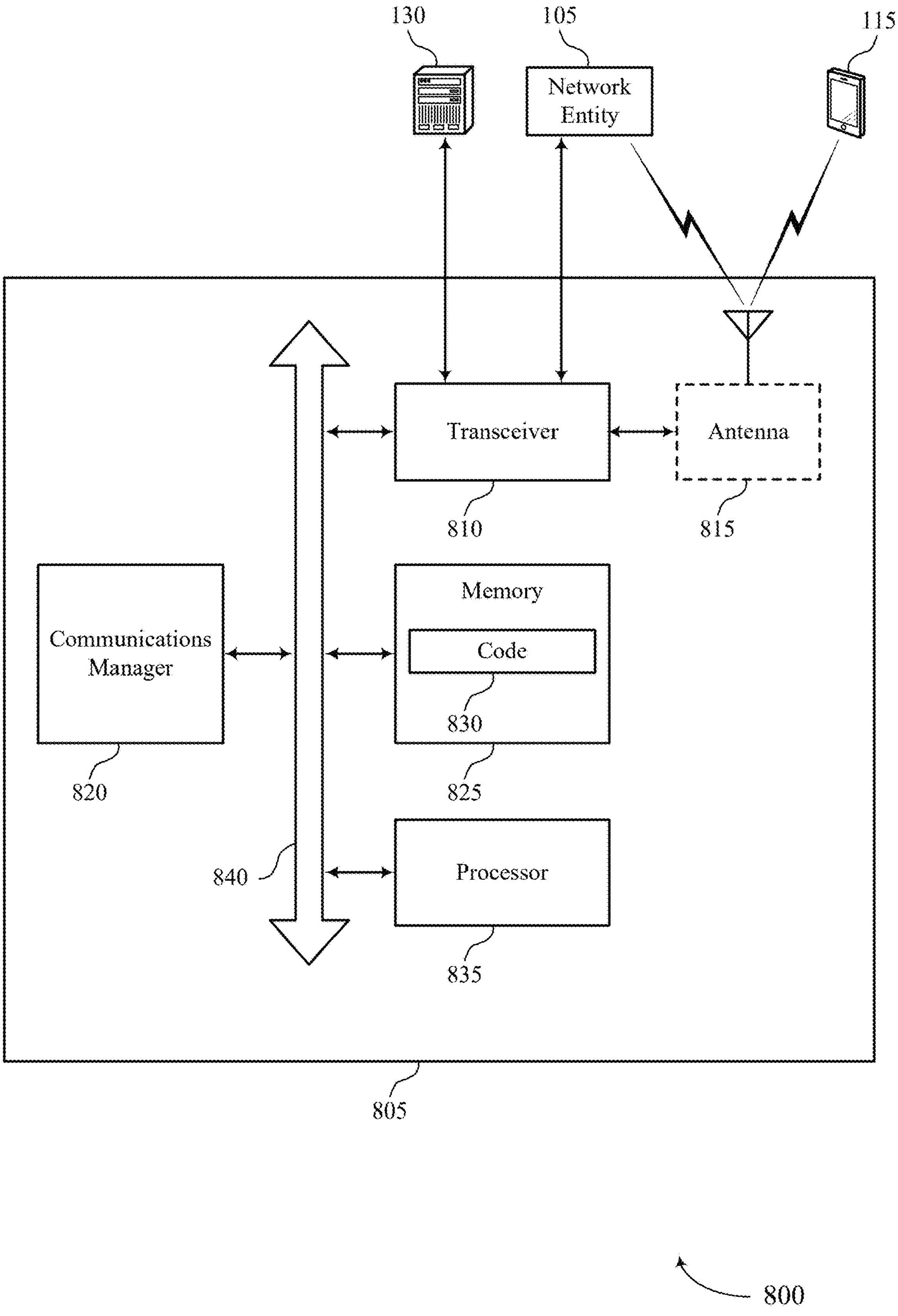
FIG. 8 shows a diagram of a system including a device that supports channel acquisition and CSF for analog and digital precoding using joint optimization in accordance with one or more aspects of the present disclosure.

FIG. 8 shows a diagram of a system 800 including a device 805 that supports channel acquisition and CSF for analog and digital precoding using joint optimization in accordance with one or more aspects of the present disclosure. The device 805 may be an example of or include components of a device 505, a device 605, or a network entity 105 as described herein. The device 805 may communicate with other network devices or network equipment such as one or more of the network entities 105, UEs 115, or any combination thereof. The communications may include communications over one or more wired interfaces, over one or more wireless interfaces, or any combination thereof. The device 805 may include components that support outputting and obtaining communications, such as a communications manager 820, a transceiver 810, one or more antennas 815, at least one memory 825, code 830, and at least one processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. In some implementations, the transceiver 810 may include one or more interfaces, such as one or more interfaces coupled with the one or more antennas 815 that are configured to support various receiving or obtaining operations, or one or more interfaces coupled with the one or more antennas 815 that are configured to support various transmitting or outputting operations, or a combination thereof. In some implementations, the transceiver 810 may include or be configured for coupling with one or more processors or one or more memory components that are operable to perform or support operations based on received or obtained information or signals, or to generate information or other signals for transmission or other outputting, or any combination thereof. In some implementations, the transceiver 810, or the transceiver 810 and the one or more antennas 815, or the transceiver 810 and the one or more antennas 815 and one or more processors or one or more memory components (e.g., the at least one processor 835, the at least one memory 825, or both), may be included in a chip or chip assembly that is installed in the device 805. In some examples, the transceiver 810 may be operable to support communications via one or more communications links (e.g., communication link(s) 125, backhaul communication link(s) 120, a midhaul communication link 162, a fronthaul communication link 168).

The at least one memory 825 may include RAM, ROM, or any combination thereof. The at least one memory 825 may store computer-readable, computer-executable, or processor-executable code, such as the code 830. The code 830 may include instructions that, when executed by one or more of the at least one processor 835, cause the device 805 to perform various functions described herein. The code 830 may be stored in a non-transitory computer-readable medium such as system memory or another type of memory. In some cases, the code 830 may not be directly executable by a processor of the at least one processor 835 but may cause a computer (e.g., when compiled and executed) to perform functions described herein. In some cases, the at least one memory 825 may include, among other things, a BIOS which may control basic hardware or software operation such as the interaction with peripheral components or devices. In some examples, the at least one processor 835 may include multiple processors and the at least one memory 825 may include multiple memories. One or more of the multiple processors may be coupled with one or more of the multiple memories which may, individually or collectively, be configured to perform various functions herein (for example, as part of a processing system).

The at least one processor 835 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 835 may be configured to operate a memory array using a memory controller. In some other cases, a memory controller may be integrated into one or more of the at least one processor 835. The at least one processor 835 may be configured to execute computer-readable instructions stored in a memory (e.g., one or more of the at least one memory 825) to cause the device 805 to perform various functions (e.g., functions or tasks supporting channel acquisition and CSF for analog and digital precoding using joint optimization). For example, the device 805 or a component of the device 805 may include at least one processor 835 and at least one memory 825 coupled with one or more of the at least one processor 835, the at least one processor 835 and the at least one memory 825 configured to perform various functions described herein. The at least one processor 835 may be an example of a cloud-computing platform (e.g., one or more physical nodes and supporting software such as operating systems, virtual machines, or container instances) that may host the functions (e.g., by executing code 830) to perform the functions of the device 805. The at least one processor 835 may be any one or more suitable processors capable of executing scripts or instructions of one or more software programs stored in the device 805 (such as within one or more of the at least one memory 825).

In some examples, the at least one processor 835 may include multiple processors and the at least one memory 825 may include multiple memories. One or more of the multiple processors may be coupled with one or more of the multiple memories, which may, individually or collectively, be configured to perform various functions herein. In some examples, the at least one processor 835 may be a component of a processing system, which may refer to a system (such as a series) of machines, circuitry (including, for example, one or both of processor circuitry (which may include the at least one processor 835) and memory circuitry (which may include the at least one memory 825)), or components, that receives or obtains inputs and processes the inputs to produce, generate, or obtain a set of outputs. The processing system may be configured to perform one or more of the functions described herein. For example, the at least one processor 835 or a processing system including the at least one processor 835 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 825 or otherwise, to perform one or more of the functions described herein.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the at least one memory 825, the code 830, and the at least one processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with one or more other network entities 105, and may include a controller or scheduler for controlling communications with UEs 115 (e.g., in cooperation with the one or more other network devices). In some examples, the communications manager 820 may support an X2 interface within an LTE/LTE-A wireless communications network technology to provide communication between network entities 105.

The communications manager 820 may support wireless communications in accordance with examples as disclosed herein. For example, the communications manager 820 is capable of, configured to, or operable to support a means for receiving a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports. The communications manager 820 is capable of, configured to, or operable to support a means for transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

Additionally, or alternatively, the communications manager 820 may support wireless communications in accordance with examples as disclosed herein. For example, the communications manager 820 is capable of, configured to, or operable to support a means for outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports. The communications manager 820 is capable of, configured to, or operable to support a means for obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof.

By including or configuring the communications manager 820 in accordance with examples as described herein, the device 805 may support techniques for improved communication reliability, improved user experience related to reduced processing, reduced power consumption, and improved coordination between devices.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the transceiver 810, one or more of the at least one processor 835, one or more of the at least one memory 825, the code 830, or any combination thereof (for example, by a processing system including at least a portion of the at least one processor 835, the at least one memory 825, the code 830, or any combination thereof). For example, the code 830 may include instructions executable by one or more of the at least one processor 835 to cause the device 805 to perform various aspects of channel acquisition and CSF for analog and digital precoding using joint optimization as described herein, or the at least one processor 835 and the at least one memory 825 may be otherwise configured to, individually or collectively, perform or support such operations.

FIG. 9 shows a flowchart illustrating a method 900 that supports channel acquisition and CSF for analog and digital precoding using joint optimization in accordance with one or more aspects of the present disclosure. The operations of the method 900 may be implemented by a network entity or its components as described herein. For example, the operations of the method 900 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 905, the method may include receiving a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of a second network entity, and where each CSI-RS resource is associated with transmission from the set of multiple transmit antenna ports. The operations of 905 may be performed in accordance with examples as disclosed herein. In some examples, aspects of the operations of 905 may be performed by a configuration component 725 as described with reference to FIG. 7.

At 910, the method may include transmitting a feedback report based on measurements of the set of multiple transmit antenna ports over the set of multiple CSI-RS resources, the feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof. The operations of 910 may be performed in accordance with examples as disclosed herein. In some examples, aspects of the operations of 910 may be performed by a reporting component 730 as described with reference to FIG. 7.

FIG. 10 shows a flowchart illustrating a method 1000 that supports channel acquisition and CSF for analog and digital precoding using joint optimization in accordance with one or more aspects of the present disclosure. The operations of the method 1000 may be implemented by a network entity or its components as described herein. For example, the operations of the method 1000 may be performed by a network entity as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1005, the method may include outputting, to a first network entity, a message including a configuration for a set of multiple CSI-RS resources, the configuration indicating a set of multiple beams associated with respective CSI-RS resources of the set of multiple CSI-RS resources and a set of multiple transmit antenna ports, where each of the set of multiple transmit antenna ports is associated with a set of antenna elements of the second network entity, and where each CSI-RS resource is associated with transmission from the set of multiple transmit antenna ports. The operations of 1005 may be performed in accordance with examples as disclosed herein. In some examples, aspects of the operations of 1005 may be performed by a configuration component 725 as described with reference to FIG. 7.

At 1010, the method may include obtaining a feedback report including a channel matrix associated with the sets of antenna elements across the set of multiple transmit antenna ports, digital precoding information for the set of multiple transmit antenna ports and analog precoding information for each of the set of multiple transmit antenna ports, or a combination thereof. The operations of 1010 may be performed in accordance with examples as disclosed herein. In some examples, aspects of the operations of 1010 may be performed by a reporting component 730 as described with reference to FIG. 7.

The following provides an overview of aspects of the present disclosure:

Aspect 1: A method for wireless communications at a first network entity, comprising: receiving a message comprising a configuration for a plurality of CSI-RS resources, the configuration indicating a plurality of beams associated with respective CSI-RS resources of the plurality of CSI-RS resources and a plurality of transmit antenna ports, wherein each of the plurality of transmit antenna ports is associated with a set of antenna elements of a second network entity, and wherein each CSI-RS resource is associated with transmission from the plurality of transmit antenna ports; and transmitting a feedback report based at least in part on measurements of the plurality of transmit antenna ports over the plurality of CSI-RS resources, the feedback report comprising a channel matrix associated with the sets of antenna elements across the plurality of transmit antenna ports, digital precoding information for the plurality of transmit antenna ports and analog precoding information for each of the plurality of transmit antenna ports, or a combination thereof.

Aspect 2: The method of aspect 1, further comprising: estimating, based at least in part on the measurements of the plurality of transmit antenna ports over the plurality of CSI-RS resources, respective wireless channels associated with each of the set of antenna elements for the plurality of transmit antenna ports.

Aspect 3: The method of any of aspects 1 through 2, wherein receiving the message further comprises: receiving an indication of an orthogonal basis associated with the plurality of beams, wherein the first network entity estimates respective wireless channels associated with each of the set of antenna elements for the plurality of transmit antenna ports based at least in part on applying the orthogonal basis across the measurements of the plurality of transmit antenna ports over the plurality of CSI-RS resources.

Aspect 4: The method of any of aspects 1 through 3, further comprising: calculating an analog precoding matrix indicating a plurality of analog beams for communications between the first network entity and the second network entity in accordance with a joint optimization operation, wherein each analog beam of the plurality of analog beams is associated with a respective transmit antenna port of the plurality of transmit antenna ports; and transmitting an indication of the analog precoding matrix, wherein the first network entity includes the indication of the analog precoding matrix in the feedback report.

Aspect 5: The method of aspect 4, wherein calculating the analog precoding matrix further comprises: calculating the analog precoding matrix based at least in part on a plurality of principal eigenvectors associated with a plurality of subchannel matrices, wherein each subchannel matrix of the plurality of subchannel matrices is associated with a respective transmit antenna port of the plurality of transmit antenna ports and the set of antenna elements of the second network entity.

Aspect 6: The method of any of aspects 4 through 5, wherein the analog precoding matrix is a block diagonal matrix.

Aspect 7: The method of any of aspects 1 through 6, further comprising: calculating a digital precoding matrix indicating a plurality of digital beams for communications between the first network entity and the second network entity in accordance with a precoding optimization operation and channel quality information associated with the digital precoding matrix, wherein the digital precoding matrix is associated with an analog-precoded channel; and transmitting an indication of the digital precoding matrix, wherein the first network entity includes the indication of the digital precoding matrix, the channel quality information, or both, in the feedback report.

Aspect 8: The method of any of aspects 1 through 7, wherein the first network entity is a UE, and the second network entity is a base station.

Aspect 9: A method for wireless communications at a second network entity, comprising: outputting, to a first network entity, a message comprising a configuration for a plurality of CSI-RS resources, the configuration indicating a plurality of beams associated with respective CSI-RS resources of the plurality of CSI-RS resources and a plurality of transmit antenna ports, wherein each of the plurality of transmit antenna ports is associated with a set of antenna elements of the second network entity, and wherein each CSI-RS resource is associated with transmission from the plurality of transmit antenna ports; and obtaining a feedback report comprising a channel matrix associated with the sets of antenna elements across the plurality of transmit antenna ports, digital precoding information for the plurality of transmit antenna ports and analog precoding information for each of the plurality of transmit antenna ports, or a combination thereof.

Aspect 10: The method of aspect 9, wherein outputting the message further comprises: outputting an indication of an orthogonal basis associated with the plurality of beams.

Aspect 11: The method of any of aspects 9 through 10, wherein obtaining the feedback report comprises: obtaining an indication of an analog precoding matrix indicating a plurality of analog beams for communications between the second network entity and the first network entity, wherein each analog beam of the plurality of analog beams is associated with a respective transmit antenna port of the plurality of transmit antenna ports.

Aspect 12: The method of aspect 11, wherein the analog channel matrix is a block diagonal matrix.

Aspect 13: The method of any of aspects 9 through 12, wherein obtaining the feedback report comprises: obtaining an indication of a digital precoding matrix, channel quality information associated with the digital precoding matrix, or both, wherein the digital precoding matrix indicates a plurality of digital beams for communications between the second network entity and the first network entity in accordance with a precoding optimization operation.

Aspect 14: The method of any of aspects 9 through 13, wherein the second network entity is a base station, and the first network entity is a UE.

Aspect 15: A first network entity for wireless communications, comprising one or more memories storing processor-executable code, and one or more processors coupled with the one or more memories and individually or collectively operable to execute the code to cause the first network entity to perform a method of any of aspects 1 through 8.

Aspect 16: A first network entity for wireless communications, comprising at least one means for performing a method of any of aspects 1 through 8.

Aspect 17: A non-transitory computer-readable medium storing code for wireless communications, the code comprising instructions executable by one or more processors to perform a method of any of aspects 1 through 8.

Aspect 18: A second network entity for wireless communications, comprising one or more memories storing processor-executable code, and one or more processors coupled with the one or more memories and individually or collectively operable to execute the code to cause the second network entity to perform a method of any of aspects 9 through 14.

Aspect 19: A second network entity for wireless communications, comprising at least one means for performing a method of any of aspects 9 through 14.

Aspect 20: A non-transitory computer-readable medium storing code for wireless communications, the code comprising instructions executable by one or more processors to perform a method of any of aspects 9 through 14.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity, comprising:

one or more memories storing processor-executable code; and one or more processors coupled with the one or more memories and individually or collectively operable to execute the code to cause the first network entity to:

receive a message comprising a configuration for a plurality of channel state information reference signal (CSI-RS) resources, the configuration comprising:

a first indication of a plurality of beams associated with respective CSI-RS resources of the plurality of CSI-RS resources and a plurality of transmit antenna ports; and a second indication of an orthogonal basis associated with the plurality of beams, wherein each of the plurality of transmit antenna ports corresponds to a respective set of antenna elements of a second network entity, and wherein each CSI-RS resource is associated with transmission from the plurality of transmit antenna ports; and transmit a feedback report based at least in part on measurements of the plurality of transmit antenna ports over the plurality of CSI-RS resources and on the orthogonal basis, the feedback report comprising a channel matrix associated with the respective sets of antenna elements corresponding to the plurality of transmit antenna ports, digital precoding information for the plurality of transmit antenna ports and analog precoding information for each of the plurality of transmit antenna ports, or a combination thereof.

2. The first network entity of claim 1, wherein the one or more processors are individually or collectively further operable to execute the code to cause the first network entity to:

estimate, based at least in part on the measurements of the plurality of transmit antenna ports over the plurality of CSI-RS resources, respective wireless channels associated with each of the respective sets of antenna elements for the plurality of transmit antenna ports.

3. The first network entity of claim 2, wherein, to receive the message, the one or more processors are individually or collectively further operable to execute the code to cause the first network entity to:

estimate the respective wireless channels associated with each of the respective sets of antenna elements for the plurality of transmit antenna ports based at least in part on applying the orthogonal basis across the measurements of the plurality of transmit antenna ports over the plurality of CSI-RS resources.

4. The first network entity of claim 1, wherein the one or more processors are individually or collectively further operable to execute the code to cause the first network entity to:

calculate an analog precoding matrix indicating a plurality of analog beams for communications between the first network entity and the second network entity in accordance with a joint optimization operation, wherein each analog beam of the plurality of analog beams is associated with a respective transmit antenna port of the plurality of transmit antenna ports; and transmit an indication of the analog precoding matrix, wherein the first network entity includes the indication of the analog precoding matrix in the feedback report.

5. The first network entity of claim 4, wherein, to calculate the analog precoding matrix, the one or more processors are individually or collectively further operable to execute the code to cause the first network entity to:

calculate the analog precoding matrix based at least in part on a plurality of principal eigenvectors associated with a plurality of subchannel matrices, wherein each subchannel matrix of the plurality of subchannel matrices is associated with a respective transmit antenna port of the plurality of transmit antenna ports and the respective set of antenna elements of the second network entity.

6. The first network entity of claim 4, wherein the analog precoding matrix is a block diagonal matrix.

7. The first network entity of claim 1, wherein the one or more processors are individually or collectively further operable to execute the code to cause the first network entity to:

calculate a digital precoding matrix indicating a plurality of digital beams for communications between the first network entity and the second network entity in accordance with a precoding optimization operation and channel quality information associated with the digital precoding matrix, wherein the digital precoding matrix is associated with an analog-precoded channel; and transmit an indication of the digital precoding matrix, wherein the first network entity includes the indication of the digital precoding matrix, the channel quality information, or both, in the feedback report.

8. The first network entity of claim 1, wherein the first network entity is a user equipment, and the second network entity is a base station.

9. A second network entity, comprising:

one or more memories storing processor-executable code; and one or more processors coupled with the one or more memories and individually or collectively operable to execute the code to cause the second network entity to:

output, to a first network entity, a message comprising a configuration for a plurality of channel state information reference signal (CSI-RS) resources, the configuration comprising:

a first indication of a plurality of beams associated with respective CSI-RS resources of the plurality of CSI-RS resources and a plurality of transmit antenna ports; and a second indication of an orthogonal basis associated with the plurality of beams, wherein each of the plurality of transmit antenna ports corresponds to a respective set of antenna elements of the second network entity, and wherein each CSI-RS resource is associated with transmission from the plurality of transmit antenna ports; and obtain a feedback report comprising a channel matrix associated with the respective sets of antenna elements corresponding to the plurality of transmit antenna ports, digital precoding information for the plurality of transmit antenna ports and analog precoding information for each of the plurality of transmit antenna ports, or a combination thereof, wherein the feedback report is based at least in part on the orthogonal basis.

10. The second network entity of claim 9, wherein, to obtain the feedback report, the one or more processors are individually or collectively operable to execute the code to cause the second network entity to:

obtain an indication of an analog precoding matrix indicating a plurality of analog beams for communications between the second network entity and the first network entity, wherein each analog beam of the plurality of analog beams is associated with a respective transmit antenna port of the plurality of transmit antenna ports.

11. The second network entity of claim 10, wherein the analog precoding matrix is a block diagonal matrix.

12. The second network entity of claim 9, wherein, to obtain the feedback report, the one or more processors are individually or collectively operable to execute the code to cause the second network entity to:

obtain an indication of a digital precoding matrix, channel quality information associated with the digital precoding matrix, or both, wherein the digital precoding matrix indicates a plurality of digital beams for communications between the second network entity and the first network entity in accordance with a precoding optimization operation.

13. The second network entity of claim 9, wherein the second network entity is a base station, and the first network entity is a user equipment.

14. A method for wireless communications at a first network entity, comprising:

receiving a message comprising a configuration for a plurality of channel state information reference signal (CSI-RS) resources, the configuration comprising:

a first indication of a plurality of beams associated with respective CSI-RS resources of the plurality of CSI-RS resources and a plurality of transmit antenna ports; and a second indication of an orthogonal basis associated with the plurality of beams, wherein each of the plurality of transmit antenna ports corresponds to a respective set of antenna elements of a second network entity, and wherein each CSI-RS resource is associated with transmission from the plurality of transmit antenna ports; and transmitting a feedback report based at least in part on measurements of the plurality of transmit antenna ports over the plurality of CSI-RS resources and on the orthogonal basis, the feedback report comprising a channel matrix associated with the respective sets of antenna elements corresponding to the plurality of transmit antenna ports, digital precoding information for the plurality of transmit antenna ports and analog precoding information for each of the plurality of transmit antenna ports, or a combination thereof.

15. The method of claim 14, further comprising:

estimating, based at least in part on the measurements of the plurality of transmit antenna ports over the plurality of CSI-RS resources, respective wireless channels associated with each of the respective sets of antenna elements for the plurality of transmit antenna ports.

16. The method of claim 15, wherein receiving the message further comprises:

estimate the respective wireless channels associated with each of the respective sets of antenna elements for the plurality of transmit antenna ports based at least in part on applying the orthogonal basis across the measurements of the plurality of transmit antenna ports over the plurality of CSI-RS resources.

17. The method of claim 14, further comprising:

calculating an analog precoding matrix indicating a plurality of analog beams for communications between the first network entity and the second network entity in accordance with a joint optimization operation, wherein each analog beam of the plurality of analog beams is associated with a respective transmit antenna port of the plurality of transmit antenna ports; and transmitting an indication of the analog precoding matrix, wherein the first network entity includes the indication of the analog precoding matrix in the feedback report.

18. The method of claim 17, wherein calculating the analog precoding matrix further comprises:

calculating the analog precoding matrix based at least in part on a plurality of principal eigenvectors associated with a plurality of subchannel matrices, wherein each subchannel matrix of the plurality of subchannel matrices is associated with a respective transmit antenna port of the plurality of transmit antenna ports and the respective set of antenna elements of the second network entity.

19. The method of claim 17, wherein the analog precoding matrix is a block diagonal matrix.

20. The method of claim 14, further comprising:

calculating a digital precoding matrix indicating a plurality of digital beams for communications between the first network entity and the second network entity in accordance with a precoding optimization operation and channel quality information associated with the digital precoding matrix, wherein the digital precoding matrix is associated with an analog-precoded channel; and transmitting an indication of the digital precoding matrix, wherein the first network entity includes the indication of the digital precoding matrix, the channel quality information, or both, in the feedback report.

21. The method of claim 14, wherein the first network entity is a user equipment, and the second network entity is a base station.

22. A method for wireless communications at a second network entity, comprising:

outputting, to a first network entity, a message comprising a configuration for a plurality of channel state information reference signal (CSI-RS) resources, the configuration comprising:

a first indication of a plurality of beams associated with respective CSI-RS resources of the plurality of CSI-RS resources and a plurality of transmit antenna ports; and a second indication of an orthogonal basis associated with the plurality of beams, wherein each of the plurality of transmit antenna ports corresponds to a respective set of antenna elements of the second network entity, and wherein each CSI-RS resource is associated with transmission from the plurality of transmit antenna ports; and obtaining a feedback report comprising a channel matrix associated with the respective sets of antenna elements corresponding to the plurality of transmit antenna ports, digital precoding information for the plurality of transmit antenna ports and analog precoding information for each of the plurality of transmit antenna ports, or a combination thereof, wherein the feedback report is based at least in part on the orthogonal basis.

23. The method of claim 22, wherein obtaining the feedback report comprises:

obtaining an indication of an analog precoding matrix indicating a plurality of analog beams for communications between the second network entity and the first network entity, wherein each analog beam of the plurality of analog beams is associated with a respective transmit antenna port of the plurality of transmit antenna ports.

24. The method of claim 23, wherein the analog precoding matrix is a block diagonal matrix.

25. The method of claim 22, wherein obtaining the feedback report comprises:

obtaining an indication of a digital precoding matrix, channel quality information associated with the digital precoding matrix, or both, wherein the digital precoding matrix indicates a plurality of digital beams for communications between the second network entity and the first network entity in accordance with a precoding optimization operation.

26. The method of claim 22, wherein the second network entity is a base station, and the first network entity is a user equipment.

* * * * *